United States Patent [19]
Tucker, Jr.

[11] 3,840,350
[45] Oct. 8, 1974

[54] FILAMENT-REINFORCED COMPOSITE MATERIAL AND PROCESS THEREFOR

[75] Inventor: Robert C. Tucker, Jr., Indianapolis, Ind.

[73] Assignee: Union Carbide Corporation, New York, N.Y.

[22] Filed: June 2, 1971

[21] Appl. No.: 149,176

[52] U.S. Cl. .................. 29/191.2, 117/93.1 PF
[51] Int. Cl. .................. B32b 15/00, C23c 7/00
[58] Field of Search .................. 29/191.2, 194; 117/93.1 PF

[56] References Cited
UNITED STATES PATENTS

| | | | |
|---|---|---|---|
| 3,084,421 | 4/1963 | McDaniels et al. | 29/191.6 X |
| 3,138,837 | 6/1964 | Weeton et al. | 29/194 |
| 3,378,392 | 4/1968 | Longo | 117/93.1 PF |
| 3,427,185 | 2/1969 | Cheatham et al. | 117/93.1 PF |
| 3,443,301 | 5/1969 | Basche et al. | 29/191.2 X |
| 3,492,119 | 1/1970 | Rosenberg | 29/191.2 UX |
| 3,503,720 | 3/1970 | Peters | 29/191.2 X |
| 3,533,759 | 10/1970 | Hittman | 29/191.2 X |
| 3,573,963 | 4/1971 | Maxwell | 117/93.1 PF X |
| 3,606,667 | 9/1971 | Kreider | 117/93.1 PF X |
| 3,617,358 | 11/1971 | Dittrich | 117/93.1 PF X |
| 3,640,755 | 2/1972 | Barth | 117/93.1 PF X |
| 3,640,757 | 2/1972 | Grubba | 117/93.1 PF |

*Primary Examiner*—A. B. Curtis
*Attorney, Agent, or Firm*—James C. Arnantes; Dominic J. Terminello

[57] ABSTRACT

A filament-reinforced composite metallic material, and process therefor, which can be fabricated into various size filament-reinforced composite sheets or strips. The metallic matrix of the composite consists of at least two plasma-sprayed particulated discrete metallic components which when subjected to a pressurized heat treatment will react to form a substantially homogeneous solid alloy matrix for the filaments.

8 Claims, 1 Drawing Figure

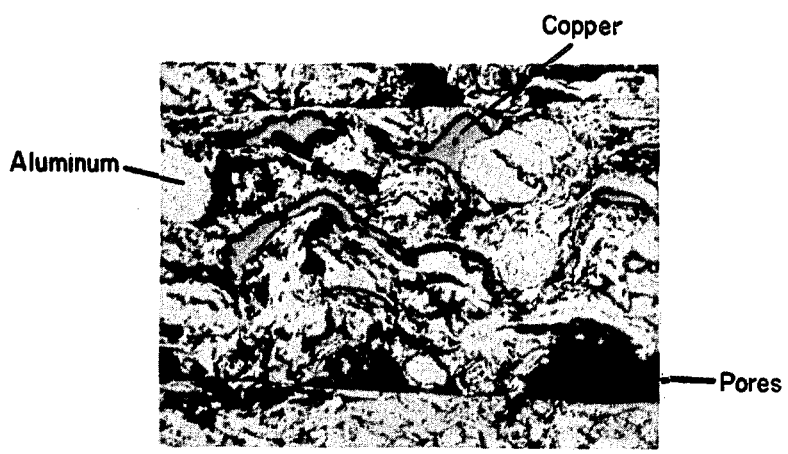
AL-CU PLASMA DEPOSITED MATRIX
( magnified 600 times )

FILAMENT-REINFORCED COMPOSITE MATERIAL AND PROCESS THEREFOR

FIELD OF THE INVENTION

This invention relates to a composite material and the process therefor. Composite materials are filament-reinforced metals or metal alloys which can be consolidated into large sheets or strips by a pressurized heat application at about 1,000 pounds per square inch or less. The metals or metal alloys for use in this composite material are required to be selected from a combination of two or more metallic components which upon being subjected to a temperature and pressure environment are capable of forming an intermediate transient liquid phase as a result of the reaction/diffusion therebetween before producing a substantially homogeneous solid alloy.

DESCRIPTION OF THE PRIOR ART

For years, metallurgists have been trying to develop materials that would be stronger than steel and yet lighter than aluminum. Thus with the recent development of fiber and/or filament-reinforced metals and plastics, the metallurgists' dream has become a reality. During the past few years tremendous advancement has been made in designing composite materials for various aerodynamical applications which exhibit impressive strength-to-weight and stiffness-to-weight ratios. For example, Thornel* graphite fibers, produced in accordance with U.S. Pat. Nos. 3,454,362 and 3,503,708, imbedded in an epoxy-resin matrix exhibits excellent tensile strength and specific modulus characteristics.

*Thornel is a registered trademark of Union Carbide Corporation.

Generally, high modulus, high strength filaments, such as boron, can be successfully employed to reinforce metals so as to provide a composite material having a higher strength-to-density and higher modulus-to-density than that of the original metals. These composites so formed are admirably suited for aerospace applications such as in the construction of jet engine components, aircraft frames and panels, and the like.

Filament-reinforced metals are fabricated in such a way that the filaments are oriented in an array to effectively resist the maximum load stresses on the material in its intended use application. This is accomplished by fabricating monolayer metal matrix composite sheets in which all the filaments are disposed parallel to each other. These unidirectional lay-up sheets can then be selectively orientated and juxtaposed, with or without an overlap, whereupon an application of a pressurized heat treatment can be employed to bond them together. Usually this bonding step requires a high pressure application generally in the order of 5,000 psi. and up.

Monolayer unidirectional composite sheets can be prepared by various methods, such as plasma spraying or hot pressing techniques. The former technique usually entails the winding of filaments, ranging in diameter from between 0.002 and 0.01 inch, onto a drum wrapped metal foil which is then plasma sprayed with a desired metal alloy. The as-sprayed sheets are removed from the drum and then formed into a flat monolayer composite sheet. The metal matrix in this type monolayer sheet is not full density and must be densified by a separate hot bonding operation or the like.

In the employment of the hot pressing technique, an array of unidirectional filaments are held apart by conventional methods between two thin sheets of the matrix metal so that upon a pressure application of 5,000 psi. or more, at a temperature of greater than 900°F., the metal sheets will deform into the spaces between the filaments producing a composite sheet. Although this technique produces nearly full density monolayer composite sheets, the overall size of the sheets are limited by the pressing apparatus used which is rather large and costly to operate. Also, the process flexibility for varying the matrix weight to compensate for variations in filament diameter is seriously limited by this technique.

Monolayer composite strips can also be prepared by infiltration of a liquid matrix into the spacing between an array of filaments. One of the problems encountered in this process, however, is the tendency for the reinforcing filaments to react, dissolve, or recrystallize on contact with the molten matrix metal. To minimize this problem it has been suggested that the filaments be coated to inhibit interaction between the filaments and matrix material and/or to alloy the metal to reduce interaction tendencies. While fully densified strips as long as 100 feet can be fabricated by this process, widths in excess of one inch are very difficult to produce and the surface of the strips are not flat due to the surface valleys between and parallel to the uniaxial filaments.

One of the primary objects of this invention is to provide a process for producing composite materials with aligned filaments which can be fabricated into various lengths and widths under the influence of a low-pressure, heated environment.

SUMMARY OF THE INVENTION

Broadly stated, the invention relates to a composite material, and the process therefor, consisting of at least one monolayer of filament-reinforced metals, metal alloys, and/or metal compounds which can be fabricated by a low-pressure heat treatment into substantially full density composite components or structures.

The sole drawing illustrates a greatly magnified cross-section of a plasma sprayed matrix of a composite material composed of discrete particles of copper and aluminum.

The selection of at least two metallic powders, selected from at least one of the groups consisting of elemental metals, metal alloys and metal compounds, as the matrix of the composite material of this invention is critical. Essentially, the metal matrix composite has to be prepared from two or more metallic powders which when simultaneously sprayed on aligned filaments in the usual manner, will produce a composite material that can be handled without disintegrating or disorientating the filaments. This as-sprayed composite material can then be appropriately aligned to form various shaped components and/or structures. The criteria of the metallic mixture is that when it is exposed to a bonding or consolidating heat treatment under low pressure (i.e., 1,000 psi. or less), the components of the mixture may react and diffuse together to form an intermediate transient liquid phase with a portion of the mixture due either to the product of the reaction or to one of the components. This transient liquid phase disappears as the reaction proceeds under the low pressure environment and produces an essentially homogeneous solid alloy matrix for the filaments embedded therein. The elemental metals and metal alloys or compounds of copper, silicon, aluminum, titanium, iron, cobalt, magnesium, nickel, zirconium, beryllium, manganese, zinc, tin, lead, bismuth and chromium, are but a few of the component materials that can be used in any and all proportions as the matrix material for this invention.

It is also possible to effect bonding and consolidation by heat treating these materials under a low pressure at a temperature below that necessary to form a transient liquid. Somewhat higher pressures or longer times are necessary than is required when a liquid phase is present. Bonding and consolidation occur due to the combined driving force of the free energy of reaction/diffusion arising from differences in chemical potential of the intimately mixed constituents while the entire system remains in the solid state. However, it should be noted that this will occur only if the constituents are present as essentially unreacted discrete particles with large surface areas in intimate contact. This condition is met by the plasma sprayed materials of this invention. In general, however, typical powder metallurgy techniques would not satisfy this requirement and would require extremely high compaction pressures and very long sintering times which would tend to mechanically and chemically damage the filaments besides requiring large high-pressure hot presses, thus severely limiting the size of the structures or bodies that could be fabricated. Furthermore, although loose powders could conceivably be used with a fugitive organic binder or infiltrated as loose powder between spaced filaments, the necessary alignment of the filaments would be extremely difficult, if not impossible, to maintain. Such difficulties have been experienced in the past with simple die or hot isostatic pressing. Moreover the removal of a binder is difficult and often leads to some contamination. The use of plasma-sprayed matrix material permanently fixes the filaments in place and this alignment is maintained throughout the composite handling and fabrication. Moreover, there is no fugitive binder to be removed which simplifies processing and reduces contamination.

Benefits of producing a composite material at low pressure are the elimination of difficulties associated with high pressure bonding, and the elimination of brazing type alloys required for braze foil or surface braze bonding. Thus the fabrication of various shapes of essentially full density composite materials comprising an array of filaments embedded in a homogeneous metallic matrix is made possible by means of subjecting the as-sprayed filament-reinforced metallic mixture prepared according to this invention to a relatively low pressure heat treament.

The excellent filament alignment obtainable in the low pressure composite material is due primarily to the fact that since only a fraction of the sprayed metallic matrix is usually present in the transient liquid phase during the initial period of the low pressure heat treatment, the remaining fraction of material remains solid and thus acts as a frame for keeping the filaments spaced apart. Upon completion of the heat treatment, the finely divided and intimately mixed powders have reacted into an essentially homogeneous solid matrix wherein the filaments are securely embedded.

The filament-reinforced metallic material can be fabricated with or without an alloy foil backing and segments thereof can be bonded together during the low pressure heating step without the need of extremely smooth flat surfaces as is required when surface brazing techniques are employed. When using an alloy foil backing, it is recommended that an alloy be selected that will be compatible with the plasma deposited material so as to decrease the time required for homogenizing the matrix composition. For example, foil backing sheets such as aluminum alloys, titanium, iron, nickel, cobalt, the alloys of these elements, superalloys, and the like are suitable for use in this invention.

The choice of filaments to be used in the composite material is somewhat arbitrary and depends primarily on their strength characteristics and their ability to coexist in the matrix material without significantly reacting therewith. Filaments such as boron, graphite, alumina, beryllium, silicon carbide, steel, and the like are admirable components for the composite materials of this invention. If a tendency exists for the particular filament to react or dissolve in the matrix material selected, then the filament may be suitably coated with a composition that will inhibit the interaction therebetween. For example, silicon carbide coated boron filaments or boron nitride coated filaments provide an exellent component for composite materials employing metallic matrixes such as aluminum-bearing alloys.

A preferred process for making a composite material according to this invention is to start with a mixture of two or more metallic powders sized between about 5 microns and about 50 microns. Filaments of a suitable size are then arranged in such a way as to produce a skeleton form wherein the spaces between adjacent filaments are void. The metallic mixture is then arc-deposited onto and between the array of filaments producing a matrix composed of a finely divided, intimate mixture of discrete metallic particles. The filaments may or may not have a foil backing as desired. For low pressure consolidation, the filament-reinforced metallic material can thereupon be heated to a temperature sufficient to allow a minor fraction of at least one of the components of the mixture to exist in a trasient liquid phase at the particle interfaces. A low pressure (i.e., 1,000 psi. or less) is applied either during the complete heat treatment or at least beginning at a period when the liquid phase starts. While maintaining the pressure and temperature environment, the mixture then becomes consolidated thereby substantially eliminating the inherent as-sprayed porosity. This reactive environment is maintained for a sufficient time to cause a diffusion reaction to occur which will produce a substantially homogeneous solid matrix from the mixture. This pressurized heat treatment is preferably carried out in an inert atmosphere, such as hydrogen, argon, or vacuum, to avoid possible oxidation of one or more of the components.

It is to be understood that the metallic powders may be elemental metals, metal alloys, metal compounds or mixtures thereof. It is also to be understood that during the pressurized heat treatment, two or more filament-reinforced metallic materials may be bonded side by side to produce a larger surface area or two or more materials may be superimposed so as to produce a multilayer composite.

For example, a mixture of approximately 96 weight per cent aluminum and 4 weight per cent copper can be plasma sprayed on a substrate to produce a finely divided, intimate mixture of solid aluminum and copper particles. This as-sprayed mixture can then be heated to above the Al-Cu eutectic temperature (548°C.) allowing a small amount of liquid phase to form at the Al-Cu particle interfaces. Thus if a low pressure is now applied, the inherent porosity of the as-sprayed mixture, 50 percent or greater, will be eliminated leaving a consolidated material. As the reaction temperature is maintained, the copper will diffuse into the remaining aluminum forming a substantially homogeneous material.

The following examples are provided to illustrate several embodiments of this invention and to show the flexibility in the heat-pressure treatment that can be employed.

EXAMPLE 1

A mixture of elemental powders consisting of 95.5 weight per cent aluminum and 4.5 weight per cent copper, sized 325 Tyler mesh and finer, was plasma sprayed on a layer of 0.0042 inch diameter silicon carbide coated boron filaments (B/SiC) aligned uniaxially with a density of 175.4 filaments per linear inch to a depth such that the volume fraction of the filaments, when the composite material was fully consolidated, would be approximately 50 percent. A greatly magnified cross-sectional view of the as-sprayed matrix, without any filaments, is shown in the drawing. This foil-less composite material was cut to ½ × 3-inch specimen sizes, with the filaments parallel to the longer dimension of the specimens. Twelve specimen pieces were then stacked, one upon the other, and placed in an argon atmosphere under a pressure of approximately 80 pounds per square inch and heated to a temperature between 576°C. to 581°C. This heat-pressure treatment was maintained for 15 minutes whereupon the aluminum and copper reacted to produce a homogeneous alloy. The so-formed composite strip was then pulled in tension with a gauge length of 1 inch whereupon it exhibited an ultimate tensile strength of 163,000 pounds per square inch. Metallographic examination of the ends of the specimen revealed that virtually all of the porosity had been eliminated. In another experiment, the result was virtually duplicated by holding the pressure at 80 pounds per square inch and the temperature at 575°C. to 581°C. for 32 minutes for a stack of six specimen pieces. The ultimate tensile strength of this composite strip was 160,000 psi. and again there was no apparent porosity in the microstructure. In a third experiment, a stack of twelve specimen pieces was held for 60 minutes at a pressure of 80 pounds per square inch and at a temperature between 588° C. and 589°C. The composite strip so formed exhibited a tensile strength of 159,000 psi. In yet another experiment, a stack of twelve specimen pieces under a pressure of 80 psi. was heated slowly from 542°C. to 560°C. over a period of 32 minutes. The composite strip so formed, exhibited a tensile strength of 179,000 psi. and upon metallographic examination, showed no apparent porosity.

EXAMPLE 2

A powdered metallic alloy, sized 200 Tyler mesh and finer, consisting of 85 weight per cent aluminum, 4.4 weight per cent silicon, 1.8 weight percent copper, 7.3 weight per cent magnesium and 1.5 weight per cent chromium, was mixed with pure aluminum powder, sized 325 Tyler mesh and finer, to produce a mixture containing 13.6 weight per cent alloy powder and 86.4 weight per cent pure aluminum powder. This mixture was plasma sprayed on 0.0042 inch diameter filaments of B/SiC aligned uniaxially with a linear spacing of 175.4 filaments per inch wrapped on a foil of alloy consisting of 0.6 weight per cent silicon, 0.25 weight per cent copper, 1.0 weight per cent magnesium, 0.20 weight per cent chromium and the balance aluminum (commercially available as Al 6061). A sufficient amount of powder was sprayed so that the final volume fraction of a completely dense composite sheet, including the foil backing, would be approximately 50 volume per cent. This composite sheet was cut to specimens of ¼ × 3 inches. These specimens were stacked, one upon the other, to a height of six layers. The multilayer composite was placed under a pressure of approximately 80 psi. in an argon atmosphere and then heated to a temperature between 610°C. to 612°C. and held thereat for a period of 16 minutes. The resulting multilayer composite strip had an ultimate tensile strength of 191,000 psi. and was of approximately theoretical density. In a similar experiment, a stack of specimens, ten layers high, under a pressure of 80 psi. in an argon atmosphere was heated to a maximum temperature of 623°C. for a period of 71 minutes. The resulting multilayer composite strip upon being tested exhibited a tensile strength of 163,000 psi. Again a ten layer specimen, under a pressure of approximately 80 psi., was held at 602°C. to 623°C. for 19 minutes producing a composite material which upon being tested exhibited a tensile strength of 169,000 psi. In another experiment, a ten-layer composite material, under a pressure of approximately 80 psi. was heated at 612°C. to 616°C. for 15 minutes. The multilayer strip, so produced, upon being tested was found to have an ultimate tesile strength of 181,000 psi. A six-layer composite material, under a pressure of approximately 80 psi., was heated at only 590°C. to 597°C. for a period of 60 minutes producing a multilayer strip which exhibited an ultimate tensile strength of 173,000 psi.

EXAMPLE 3

An alloy consisting of 88 weight per cent aluminum and 12 weight per cent silicon was mixed with pure aluminum to produce an overall alloy having 56 weight per cent pure aluminum powder and 44 weight per cent aluminum alloy powder. The powder mixture sized 200 Tyler mesh and finer, was plasma-sprayed on 0.0042 inch diameter B/SiC filaments wound on a 6061 Al alloy foil backing so that the final volume of the composite, including the backing sheet, would be approximately 50 percent. The wound filaments had a linear spacing of 175.4 filaments per inch. This composite sheet was cut to ¼ × 3 inch specimens. a six-layer stack of this material, under a pressure of approximately 80 psi. and in an argon atmosphere, was held at a temperature of 600°C. to 606°C. for 74 minutes. The composite strip so formed exhibited a tensile strength of 150,000 psi. when subjected to a tensile test as described in Example 1. A similar six-layer specimen, under a pressure of 80 psi. and held at a temperature of 580°C. to 588°C. for 61 minutes produced a composite strip which exhibited a tensile strength of 145,000 psi. A ten-layer specimen under a pressure of 80 psi. and held 63 minutes at a temperature of 581°C. to 596°C., produced a composite strip which exhibited a tensile strength of 148,000 psi. A similar ten-layer specimen, under a pressure of 80 psi. and hat a temperature of 588°C. to 591°C. for 15 minutes produced strip which exhibited a tensile strength of 150,000 psi.

EXAMPLE 4

A powdered metallic alloy, sized 200 Tyler mesh and finer, consisting of 85 weight per cent aluminum, 4.4 weight per cent silicon, 1.8 weight per cent copper, 7.3 weight per cent magnesium and 1.5 weight per cent chromium, was mixed with pure aluminum powder, sized 325 Tyler mesh and finer, to produce an overall mixture containing 13.6 weight per cent alloy powder and 86.4 weight per cent pure aluminum powder. This mixture was plasma sprayed on 0.0057 inch diameter filaments of B/SiC aligned uniaxially with a linear spacing of 139.4 filaments per inch wrapped on a foil of aluminum alloy (commercially available of Al 6061). A sufficient amount of powder was sprayed so that the final volume fraction of a completely dense composite sheet, including the foil backing, would be approximately 50 volume per cent. Ten sheets of the composite material, 3×5 inches were stacked one upon the other. The multilayer composite was placed in a chamber and evacuated to less than $2 \times 10^{-4}$ torr and pressed under 100 psi. for 15 minutes at 616°C. Three tensile specimens cut from the resulting, essentially fully dense, composite sheet with the filaments aligned parallel to the tensile axis exhibited ultimate strengths of 188,000, 176,000, and 168,000 psi. Two tensile specimens cut from the sheet with the filaments perpendicular to the tensile axis exhibited strengths of 14,400 and 18,000 psi.

A multilayer composite assembly identical to the above was pressed in a vacuum of less than $2 \times 10^{-4}$ torr at 593°C. for 1 hour under a pressure of 250 psi. Two tensile specimens cut from the sheet with the filaments parallel to the tensile axis exhibited strengths of 168,000 and 173,000 psi., while two specimens cut with the filaments perpendicular to the tensile axis exhibited strengths of 15,200 and 14,000 psi. In another experiment with the same composite material, a multilayer assembly was pressed under a vacuum of less than $2 \times 10^{-4}$ torr for 1 hour at 566°C. under a pressure of 500 psi. The ultimate tensile strengths of two specimens cut with the filaments aligned parallel to the tensile axis were 158,000 and 180,000 psi. while two specimens cut with the filaments perpendicular to the tensile axis exhibited strenghts of 15,400 and 16,400 psi.

What is claimed is:
1. A process for producing filament-reinforced composite metallic material comprising:
   a. arranging filaments in such a way as to produce a skeleton form wherein the spacings between adjacent filaments are void;
   b. selecting at least two metallic powders from at least one of the groups consisting of elemental metals, metal alloys and metal compounds, and wherein said metals and the metal components of said alloys and compounds are selected from the group consisting of copper, silicon, aluminum, titanium, iron, cobalt, magnesium, nickel, zirconium, beryllium, mangenese, zinc, tin, lead, bismuth and chromium, which when appropriately mixed and subjected to a heated pressurized environment can form an intermediate transient liquid phase during the reaction diffusion therebetween while a portion of at least one of the powders remains in a solid state and upon complete reaction/diffusion will produce a substantially homogeneous alloy; and
   c. arc-depositing said metallic powders in a (substantial) unreacted state onto the skeleton form so as to imbed said filament comprising said form in the as-deposited metallic powder matrix to produce said filament-reinforced composite metallic material composed of an array of filaments embedded in said plasma-deposited metallic matrix, said matrix consisting essentially of at least two of said particulated discrete metallic powders, capable of reaction/diffusion to produce a substantially homogeneous solid alloy matrix.

2. The process of claim 1 wherein the filament form in step (a) is placed on a metallic foil backing sheet.

3. The process of claim 1 wherein said filaments are selected from at least one of the groups consisting of boron, graphite, alumina, beryllium, silicon carbide and steel.

4. The process of claim 3 wherein said filaments are coated with a suitable material so as to inhibit the interaction between the filaments and the matrix material.

5. The process of claim 1 wherein after step (c) the following step is added:
   d. heating said filament-reinforced as-deposited metallic material to a temperature and under a suitable pressure for a time period sufficient to cause substantial diffusion/reaction between the matrix powders to produce a substantially homogeneous solid alloy matrix therefrom.

6. A filament-reinforced composite metallic product made by the process of claim 1.

7. The product of claim 6 wherein said filaments are selected from at least one of the groups consisting of boron, graphite, alumina, beryllium, silicon carbide and steel.

8. The product of claim 7 wherein said filaments are parallel orientated.

* * * * *